Sept. 29, 1942.  M. E. McCLELLAN  2,297,310
PICK-UP MECHANISM
Filed Jan. 2, 1941  2 Sheets—Sheet 1

INVENTOR:
MARCUS E. McCLELLAN
BY
ATTORNEYS.

Patented Sept. 29, 1942

2,297,310

UNITED STATES PATENT OFFICE 2,297,310

PICK-UP MECHANISM

Marcus E. McClellan, Ottumwa, Iowa, assignor to Dain Manufacturing Company of Iowa, Ottumwa, Iowa, a corporation of Iowa Application January 2, 1941, Serial No. 372,697

9 Claims. (Cl. 56—364)

The present invention relates to agricultural implements and more particularly to pick-up devices of the type comprising a wheel-supported frame, a rotary raking cylinder journaled thereon, and an endless belt conveyor trained around the cylinder and serving to strip the crop picked up by the cylinder and to convey the crop up to a point of delivery. A pick-up device of this character is commonly associated with or forms a part of a hay loader.

The principal object of the invention is to provide improved means for maintaining the teeth of the raking cylinder in proper position to pick up the hay or other crop and deliver it to the belt conveyor and then allowing the teeth to trail freely as they are withdrawn from the mass of hay on the conveyor. Heretofore, the position of the teeth has been controlled by means of cams or tracks on the rake frame which engage cam followers on the rake bars to rock the latter to the desired positions at the proper points. There is a considerable amount of friction in this form of construction, however, due to the sliding action of the cam followers over the stationary cam, together with the difficulty of keeping the exposed frictional surfaces clean and well lubricated. Since the power for driving the raking cylinder and conveyor is usually derived from one of the wheels on which the rake is supported, it follows that such frictional losses result in increased draft.

The present invention has for one of its objects, therefore, the provision of means for controlling the position of the teeth so constructed and arranged as to be free of sliding friction between coacting stationary and movable members. In the accomplishment of this object, I employ cams on the tooth bars of the raking cylinder which are engaged by the endless belt conveyor to hold the teeth in the proper position, said cams being released by the conveyor when the latter leaves the cylinder to allow the teeth to trail freely as they are withdrawn from the hay.

A further object of this invention is to reduce the cost of manufacturing by eliminating the stationary cam which has, until now, been necessary for controlling the position of the rake teeth.

These and other objects and advantages of the present invention will become apparent to those skilled in the art after consideration of the following detailed description of the preferred embodiment thereof, reference being had to the accompanying drawings, in which Figure 1 is a side elevation of a hay loader having a raking cylinder embodying the principles of my invention;

Figure 1:
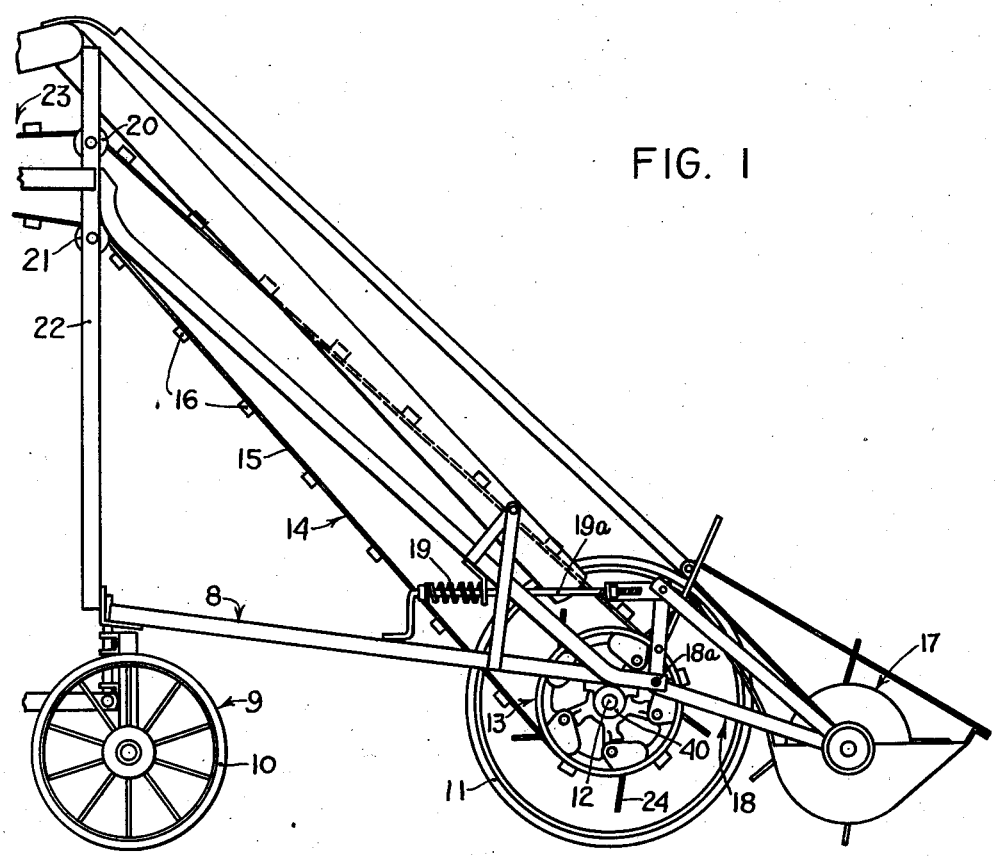
Figure 2:
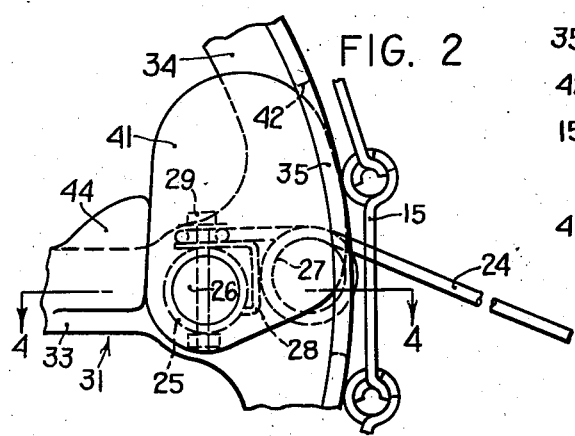
Figure 2 is an enlarged fragmentary side view of the head of the raking cylinder, showing one of the tooth bars and its associated cam which is engaged by the conveyor chain to hold the teeth in proper position.
Figure 3:
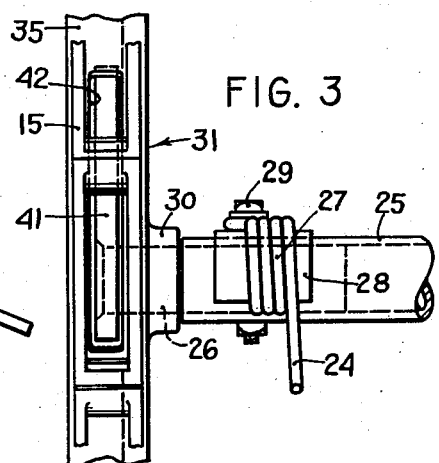
Figure 3 is a rear view of the same structure as viewed from the right of Figure 2.
Figure 4:
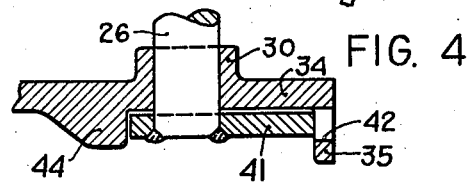
Figure 4 is a sectional view, taken along the line 4—4 in Figure 2.

Referring now to the drawings, I have illustrated my invention embodied in a double cylinder type of hay loader, the general construction of which is well known, and therefore I shall describe in detail only such parts thereof as have particular relation to my invention. Generally this type of machine comprises any suitable frame 8 supported at its front end by a fore-carriage 9 having steerable wheels 10, and at its rear end by two main drive wheels 11, only one of which is shown in Figure 1. The wheels 11 are mounted on opposite ends of a live axle 12 which rotates with the wheels in a counter-clockwise direction as the loader travels forwardly. Supported on the live axle 12 between the wheels 11 is a raking cylinder 13 over which travels an endless belt conveyor 14. This conveyor preferably consists of a pair of laterally spaced endless belts or chains 15 to which there are affixed at suitable intervals a series of carrier slats 16. The usual flexible ropes or webbing (not shown) may be fixed to successive slats to define the conveying surface of the carrier. The carrier 14 extends upwardly and forwardly from the cylinder 13 to rollers 20 and 21 journaled on the upper ends of frame uprights 22, and thence passes forwardly over suitable sheaves (not shown) at the front end of a vertically adjustable frame portion 23. The hay conveyed by the upper flight of the conveyor is discharged from the forward end of the frame 23 down onto the hay rack to which the loader is hitched. A second cylinder 17, disposed to the rear of cylinder 13, assists the latter in raking the hay up from the ground. This second cylinder is journaled on a frame 18 which is pivoted at 18a on the main frame 8 and is yieldingly supported for vertical movement relative thereto, by means of a spring 19 and tie rod 19a. The cylinder 17 is driven in a clockwise direction from the raking cylinder 13 by any suitable driving connection (not shown).

The hay is picked up from the ground and placed on the upper flight of the carrier by the raking cylinder 13 through the agency of transversely extending rows of teeth 24 mounted on tooth-supporting rake bars 25. The rake bars 25 are preferably in the form of pipes having short lengths of shafting inserted into the ends thereof and projecting outwardly to provide pins 26 which are journaled in suitable bearings 30 provided in two end heads 31 of the cylinder 13. Preferably, although not necessarily, the rake teeth 24 are made of spring steel wire and are formed with coils 27 adjacent and parallel to the rake bar 25 which give the teeth additional resiliency. The teeth are detachably mounted on the rake bar in any suitable manner, as with clips 28 and bolts 29. The end heads 31 are each constructed in the form of a wheel having a central hub 32 from which radiate spokes 33 carrying a rim portion 34 which includes an axially extending flange 35. The chains 15 of the conveyor track on the peripheries of these flanges 35 of the cylinder heads. The hub 32 of each end head has a journal portion 36 which has bearing support in a bearing 40 bolted to the frame 8 of the machine, and the journal portion 36 is apertured to receive the axle 12 to which it is fixed or otherwise connected to be rotated thereby.

The pins 26 of the tooth-carrying bars extend through their respective bearings 30 and beyond the rim 34, and have shoes or cams 41 fixed to their outer ends as by welding. These cams are adapted to pass through circumferentially extending slots 42 which are provided in the rim flange 35 adjacent each tooth bar, and are engageable by the chains 15 of the conveyor to limit the clockwise rocking movement of the tooth bars while the teeth 24 are engaged in picking up and carrying hay to the upper flight of the conveyor. The cams 41 are shaped to provide an outer surface conforming generally with the outer surface of the flange 35.

Figure 5:
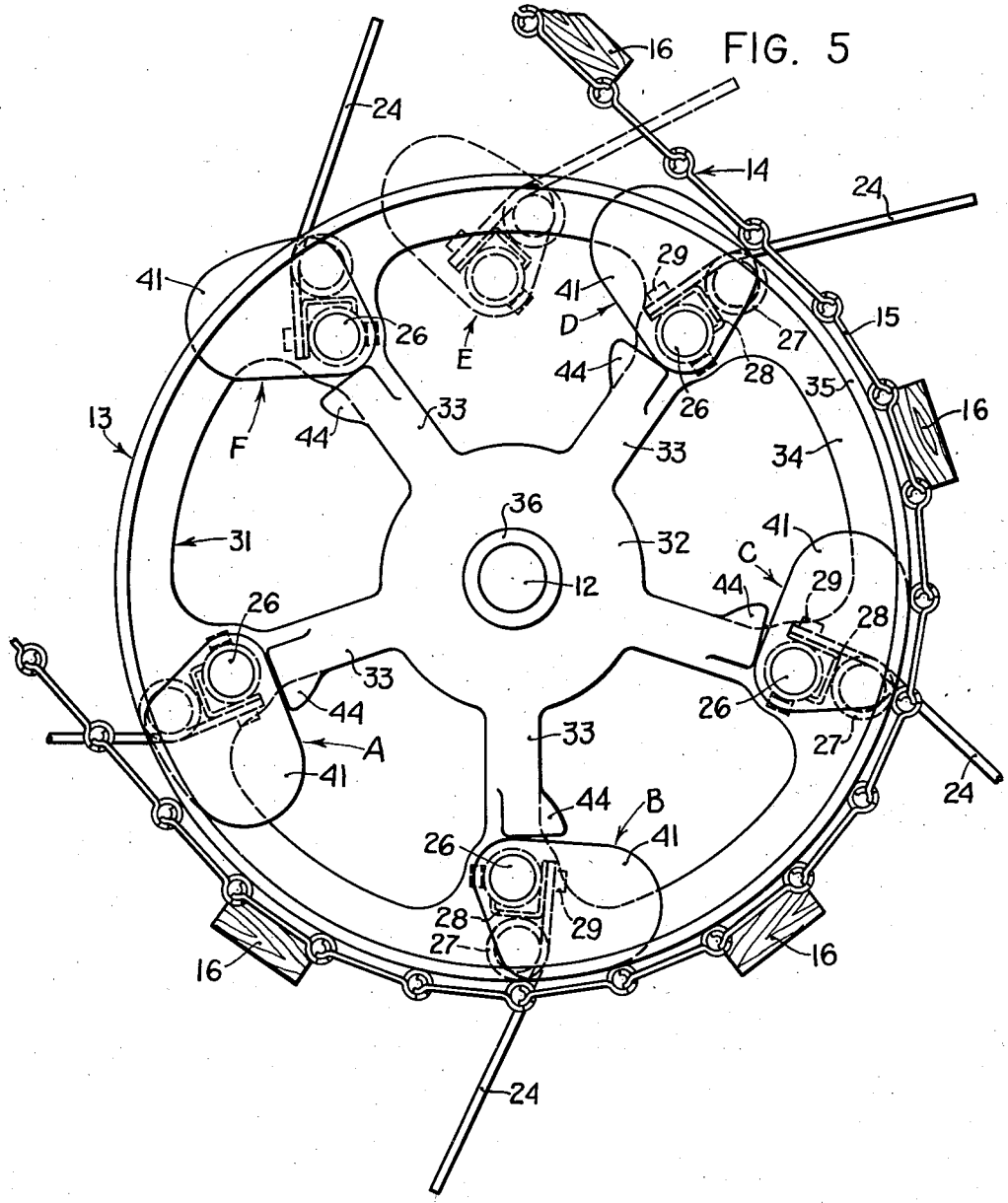
Figure 5 is an enlarged end view of the raking cylinder, showing the positions of the rake teeth at various points about the axis of the cylinder.

Formed on the outer face of each of the end head spokes 33 adjacent the cam 41 is an outwardly projecting limit stop 44 which is adapted to engage the inner edge of the cam to limit the counterclockwise rocking movement thereof when the center of gravity of the teeth passes over the axis of the rake bar and the latter falls by gravity to the position assumed by the rake bar assembly indicated at A in Figure 5.

When the teeth 24 encounter the resistance of the hay, as in the rake bar assemblies at B and C (Figure 5), the rake bars tend to rock in a clockwise direction, causing the cams 41 to pass through the slots 42 in the flange 35 and to bear against the inside of the chains 15. The chains limit the cams against further movement and thus serve to maintain the teeth 24 at the proper angle to the surface of the cylinder 13 for picking up and carrying the hay. As the rake bar assembly approaches the top of the cylinder where the chains 14 leave the head 13 the cam 41 is permitted to project on through the slots 42, allowing the rake bar to rock in a clockwise direction to withdraw the teeth from the hay on the conveyor with the least resistance. In Figure 5, the rake bar assembly, indicated at D, has just moved out through the slot 42 and has begun to rock clockwise, as described above. At E, the rake bar assembly is shown in dotted lines near its final stage of withdrawal, and at F it has passed the point where the center of gravity of the rake teeth has moved to the left of the axis of the rake bar 25, and the latter is just about to rock counterclockwise by gravity to the limiting position of the stop 44.

It is believed that the operation of my invention and the advantageous features thereof will be apparent from the foregoing, and what I claim, therefore, and desire to secure by Letters Patent is:

1. In an implement having a rotary cylinder and a belt trained around the same, at least one tooth-carrying member pivotally supported on said cylinder for rotation about an axis substantially parallel to the axis of the cylinder, and means on said tooth-carrying member engageable by said belt during a portion of each revolution of the cylinder for holding the tooth-carrying member in fixed position with respect to the cylinder.

2. In a pick-up device having a rotary pick-up cylinder and an endless belt conveyor trained around the cylinder, a plurality of tooth-carrying members mounted on said cylinder for relative swinging movement, each of said members having radially extending teeth adapted to pick up crop from the ground and to carry the same onto the conveyor belt, and control means on the tooth-carrying members engageable by the conveyor to hold said members with the teeth projecting substantially radially from the cylinder, said teeth being swingable to an acute angle with respect to the tangent of the cylinder when said control means moves out of contact with the conveyor belt to allow the teeth to be withdrawn from the mass of hay on the conveyor.

3. In an implement having a rotary cylinder and a belt trained around the same, at least one tooth-carrying member pivotally supported on said cylinder for swinging movement in a plane perpendicular to the axis thereof, and a cam fixed to said tooth-carrying member and engageable by said belt to limit the movement of the tooth-carrying member in one direction.

4. In a pick-up device, a pick-up cylinder journaled for rotation about a horizontal axis, said cylinder being provided at one end with an axially extending flange having circumferentially extended slots formed therein, a plurality of tooth-carrying members mounted on said cylinder for swinging movement about axes parallel to the axis of the cylinder, each of said tooth-carrying members having a cam fixed thereto which is adapted to pass through one of said slots, and an endless belt conveyor trained around said cylinder, said conveyor covering said slots during a portion of each revolution of the cylinder to engage said cams and hold the tooth-carrying members in fixed position in relation to the cylinder.

5. In an implement having a rotary cylinder and a belt trained around the same, at least one tooth-carrying member pivotally supported on said cylinder for swinging movement toward and away from the periphery of the cylinder, means on said tooth-carrying member engageable by said belt to limit the movement of the member in one direction, and means for limiting the movement of the tooth-carrying member in the other direction.

6. In an implement having a rotary cylinder and a belt trained around the same, at least one tooth-carrying member pivotally supported on said cylinder for swinging movement toward and away from the outer periphery of the cylinder, a cam fixed to said tooth-carrying member and engageable by said belt to limit the movement of the tooth-carrying member toward the periphery of the cylinder, and a limit stop on the cylinder engageable with said cam to limit the movement of the member away from the periphery of the cylinder.

7. In an implement having a rotary cylinder and a belt trained around the same, a raking tooth mounted on said cylinder for movement relative thereto between an extended position and a retracted position, and means engageable by said belt operative to move said raking tooth from said retracted position to said extended position during a portion of each revolution of the cylinder.

8. In an implement having a rotary pick-up cylinder, a tooth-carrying member journaled on the cylinder for rotation between retracted and extended positions, a cam fixed to said member, a belt conveyor trained around said cylinder, said conveyor being positioned to engage said cam at a point spaced radially from the axis of rotation of the tooth-carrying member during a portion of each revolution of the cylinder to move said member to extended position.

9. In an implement having a rotary pick-up cylinder, an endless belt trained around said cylinder, a raking tooth mounted on the cylinder for movement between operative and inoperative positions, and means engageable by said belt during a portion of each revolution of the cylinder and responsive to the radial pressure of the belt for moving said raking tooth to operative position.

MARCUS E. McCLELLAN.